United States Patent

Ju et al.

Patent Number: 5,843,521
Date of Patent: Dec. 1, 1998

[54] PHOTORESIST FRAME PLATED MAGNETIC TRANSDUCER POLE LAYER EMPLOYING HIGH MAGNETIC PERMEABILITY SEED LAYER

[75] Inventors: Kochan Ju, Fremont; Mao-Min Chen; Yimin Guo, both of San Jose, all of Calif.

[73] Assignee: Headway Technologies, Inc., Milpitas, Calif.

[21] Appl. No.: 897,796

[22] Filed: Jul. 21, 1997

[51] Int. Cl.$^6$ ...................................................... B05D 5/12
[52] U.S. Cl. ................... 427/129; 156/625.1; 360/113; 427/130; 427/131; 427/132; 427/259; 427/265; 427/272; 427/282; 427/305; 427/331; 427/383.1; 427/404; 427/419.2; 427/419.7; 428/336; 428/457; 428/693; 428/698
[58] Field of Search ................... 156/625.1; 360/113; 427/129, 130, 131, 132, 259, 265, 272, 282, 305, 331, 383.1, 404, 419.2, 419.7; 428/336, 457, 693, 698

[56] References Cited

PUBLICATIONS

Robertson et al. "High Performance Write Head Using NiFe 45/55" 1997 Digests of Intermag '97, Apr. 1–4, 1997, p. AA–02.

Guo et al. "Low Fringe–Field and Narrow–Track MR Heads", 1997 Digest of Intermag 1997, Apr. 1–4, p. AA–05.

*Primary Examiner*—Bernard Pianalto
*Attorney, Agent, or Firm*—George O. Saile; Stephen B. Ackerman; Alek P. Szecsy

[57] ABSTRACT

A method for forming a magnetic transducer, and a magnetic transducer formed through the method. There is first provided a substrate. There is then formed over the substrate a first magnetic pole layer. There is then formed upon the first magnetic pole layer a gap filling dielectric layer. There is then formed upon the gap filling dielectric layer a seed layer. There is then formed upon the seed layer a photoresist frame employed in a photoresist frame plating method for forming a plated second magnetic pole layer upon the seed layer, where a base of a sidewall of the photoresist frame has a taper which provides a notch within an edge of the plated second magnetic pole layer at its interface with the seed layer. There is then plated through the photoresist frame plating method the plated second magnetic pole layer upon the seed layer, where the seed layer is formed of a thickness and of a material which compensates when electromagnetically energizing the magnetic transducer for a magnetic write field gradient boundary decompression between the first magnetic pole layer and the plated second magnetic pole layer due to the notch within the plated second magnetic pole layer. The method for forming the magnetic transducer contemplates the magnetic transducer formed through the method.

10 Claims, 5 Drawing Sheets

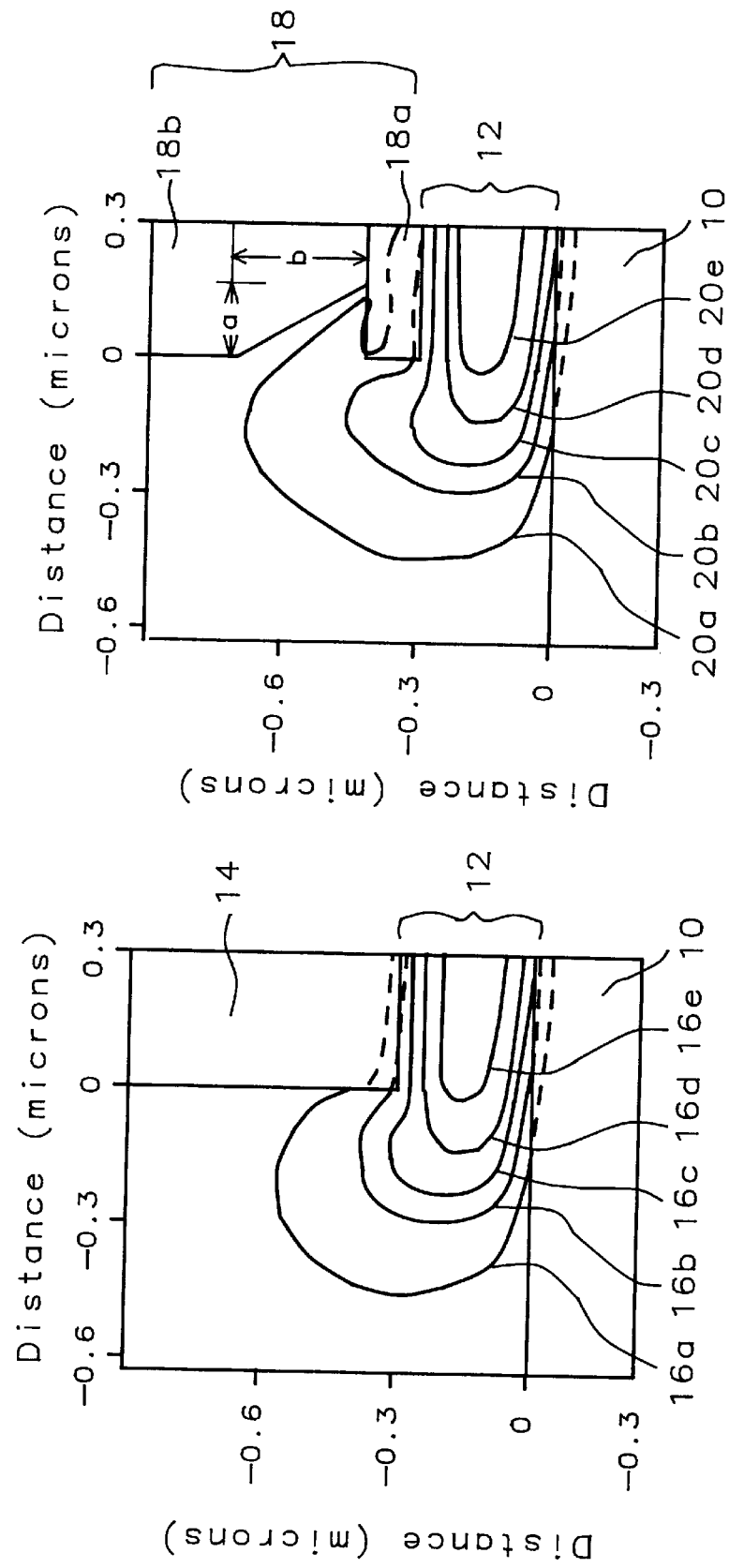
FIG. 1 - Prior Art    FIG. 2 - Prior Art

PHOTORESIST FRAME PLATED MAGNETIC TRANSDUCER POLE LAYER EMPLOYING HIGH MAGNETIC PERMEABILITY SEED LAYER

BACKGROUND OF THE INVENTION

1. Field of the Invention

The present invention relates generally to magnetic transducers employed within magnetic data storage and retrieval. More particularly, the present invention relates to plating methods for forming magnetic pole layers within magnetic transducer heads employed within magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically measured as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic transition density within the magnetic data storage medium. The track width, the track spacing and the linear magnetic transition density within the magnetic data storage medium are in turn determined by several principal factors, including but not limited to: (1) the magnetic read-write characteristics of a magnetic read-write transducer head employed in reading and writing digitally encoded magnetic data from and into the magnetic data storage medium; (2) the magnetic transition characteristics of the magnetic data storage medium; and (3) the separation distance of the magnetic read-write transducer head from the magnetic data storage medium.

With regard to the magnetic read-write characteristics of magnetic read-write transducer heads employed in reading and writing digitally encoded magnetic data from and into a magnetic data storage medium, it is known in the art of magnetic read-write transducer head fabrication that the methods, materials and dimensions through which are formed magnetic pole layers within magnetic read-write transducer heads typically significantly influence the magnetic read-write characteristics of those magnetic read-write transducer heads.

In particular, it is known in the art of magnetic read-write transducer head fabrication that a plated magnetic pole layer formed within a magnetic read-write transducer head through a photoresist frame plating method often encounters a notching within the plated magnetic pole layer due to a tapering of a base of a sidewall of a photoresist frame employed within the photoresist frame plating method. The magnetic read-write transducer head having formed therein the notched plated magnetic pole layer typically exhibits compromised inductive magnetic write properties. A pair of schematic plan-view diagrams illustrating a pair of magnetic read-write transducer heads one of which has formed therein a notched plated magnetic pole layer formed through a photoresist frame plating method and the other of which has formed therein a straight sided magnetic pole layer, along with magnetic write field gradient boundaries typically observed incident to electromagnetically energizing each of the magnetic read-write transducer heads, is shown in FIG. 1 and FIG. 2.

Shown in FIG. 1 is a schematic plan-view diagram illustrating in part the magnetic read-write transducer head having formed therein the straight sided magnetic pole layer. Shown in FIG. 1 is the magnetic read-write transducer head comprising a lower magnetic pole layer 10 separated from a straight sided upper magnetic pole layer 14 by a gap 12. Also shown in FIG. 1 is a series of compressed magnetic write field gradient boundaries 16a to 16e (in increasing magnetic field strength) between the lower magnetic pole layer 10 and the straight sided upper magnetic pole layer 14 formed incident to electromagnetically energizing the magnetic read-write transducer head. As is seen from the schematic cross-sectional diagram of FIG. 1, the compressed magnetic write field gradient boundaries 16a to 16e are closely spaced approximately to the edge of the straight sided upper magnetic pole layer 14 over the lower magnetic pole layer 10. Since it is recognized in the art of magnetic read-write transducer fabrication that magnetic transitions within magnetic media are effected as a consequence of the degree of compression of magnetic write field gradient boundaries, in addition to the magnitude of a magnetic write field, the magnetic read-write transducer head whose schematic plan-view diagram is illustrated in FIG. 1 typically exhibits a maximum write track width in conjunction with a minimum write fringe field.

In contrast, there is shown in FIG. 2 the schematic plan-view diagram of the magnetic read-write transducer head otherwise equivalent to the magnetic read-write transducer head whose schematic plan-view diagram is illustrated in FIG. 1, but wherein the straight sided upper magnetic pole layer 14 as illustrated in FIG. 1 has been replaced with a notched plated pole layer 18 formed from a patterned seed layer 18a having formed thereupon a plated upper magnetic pole layer 18b. Within FIG. 2, the plated upper magnetic pole layer 18b is formed through a photoresist frame plating method. Typically, the patterned seed layer 18a has a thickness of from about 500 to about 1000 angstroms and the patterned seed layer 18a may be formed of either: (1) a non-magnetic seed layer material, such as copper or a non-magnetic copper alloy; or (2) a magnetic seed layer material, such as a permalloy (ie: nickel:iron alloy) magnetic seed layer material. Typically, the notching within the plated upper magnetic pole layer 18b at its interface with the patterned seed layer 18a extends over the seed layer 18a for a distance "a" within the width of the patterned seed layer 18a, as illustrated in FIG. 2, of from about 1000 to about 3000 angstroms and for a distance "b" within the thickness of the plated upper magnetic pole layer 18b, as illustrated in FIG. 2, of from about 2000 to about 4000 angstroms.

Finally, there is shown in FIG. 2 the presence of a series of decompressed magnetic write field gradient boundaries 20a to 20e (in increasing magnetic field strength). As is seen from FIG. 2, the series of decompressed magnetic write field gradient boundaries 20a to 20e is not closely spaced at the edge of the patterned seed layer 18a and corresponding notch within the plated upper magnetic pole layer 18b. The decompression of the decompressed magnetic write field gradient boundaries 20a to 20e incident to electromagnetically energizing the magnetic read-write transducer head whose schematic cross-sectional diagram is illustrated in FIG. 2 presumably derives at least in part from magnetic saturation of the patterned seed layer 18a. Thus, when employing the magnetic read-write transducer head whose schematic plan-view diagram is illustrated in FIG. 2 to write a magnetic data signal into a magnetic data storage medium there is observed in comparison with the magnetic read-write transducer head whose schematic plan-view diagram is illustrated in FIG. 1 a reduced write track width and an increased write fringe field width. Unfortunately, comparatively reduced write track widths and comparatively increased write fringe field widths are typically undesirable within magnetic read-write transducer heads employed within magnetic data storage and retrieval.

In light of the comparison between the spacing of the magnetic write field gradient boundaries within the electromagnetically energized magnetic read-write transducer heads whose schematic plan-view diagrams are illustrated in FIG. 1 and FIG. 2, it is thus desirable in the art of magnetic read-write transducer head fabrication to provide photoresist frame plating methods and materials through which there may be formed plated upper magnetic pole layers without experiencing decompression of magnetic write field gradient boundaries when electromagnetically energizing magnetic read-write transducer heads within which are formed those photoresist frame plated upper magnetic pole layers. It is towards that goal that the present invention is directed.

Novel methods and materials for forming magnetic read-write transducer heads with improved properties are known in the art of magnetic read-write transducer head fabrication. For example, Levenson et al., in U.S. Pat. No. 5,414,580, discloses a magnetic storage system having formed therein a thin film magnetic read-write transducer head, where a magnetic coil within the thin film magnetic read-write transducer head is formed employing a phase shifted photolithographic mask. Through use of the phase shifted photolithographic mask, there is avoided contrast effects which otherwise yield a notching within the magnetic coil employed within the thin film magnetic read-write transducer head.

In addition, Robertson et al., in "High Performance Write Head Using NiFe 45/55," 1997 Digests of INTERMAG '97, Apr. 1–4, 1997, pg. AA-02, disclose the use of nickel:iron 45:55 w.w permalloy alloy within upper magnetic pole layers within magnetic write transducer heads. In comparison with conventional magnetic write transducer heads having formed therein upper magnetic pole layers formed of the conventional nickel:iron 81:19 w:w permalloy alloy, the magnetic write transducer heads so formed exhibit improved properties, including increased magnetic moment and inreased resistivity.

Finaly, Guo et al., in "Low Fringe-Field and Narrow-Track MR Heads," 1997 Digests of INTERMAG 1997, Apr. 1–4, 1997, pg. AA-05, disclose a merged magnetoresistive (MR) transducer head employing a raised throat within a shared pole within the merged magnetoresistive (NMR) transducer head. The raised throat within the shared pole minimizes a write fringe field wihin the merged magnetoresistive (N) transducer head and thus improves off-track performance within the merged magnetoresistive (MR) transducer head.

Desirable in the art are additional photolithographic methods and materials which may be employed in forming magnetic read-write transducer heads. Particularly desirable in the art are additional photoresist fame plating methods and materials through which may be formed photoresist frame plated magnetic pole layers within inductive magnetic write transducer heads while avoiding when electromagnetically energizing those inductive magnetic write transducer heads magnetic write field gradient boundary decompression within those inductive magnetic write transducer heads incident to forming photoresist frame plated notched magnetic pole layers through those photoresist frame plating methods. It is towards the foregoing goals that the present invention is more specifically directed.

SUMMARY OF THE INVENTION

A first object of the present invention is to provide a photoresist frame plating method for forming a photoresist frame plated magnetic pole layer within an inductive magnetic write transducer head.

A second object of the present invention is to provide a method in accord with the first object of the present invention, where there is avoided when electromagnetically energizing an inductive magnetic write transducer head formed through the method a magnetic write field gradient boundary decompression within the inductive magnetic write transducer head incident to forming a photoresist frame plated notched magnetic pole layer through the photoresist frame plating method.

A third object of the present invention is to provide a method in accord with the first object of the present invention and the second object of the present invention, which method is readily manufacturable.

In accord with the objects of the present invention, there is provided by the present invention a method for forming a magnetic transducer which may be employed within an inductive write magnetic transducer head. To practice the method of the present invention, there is first provided a substrate. There is then formed over the substrate a first magnetic pole layer. There is then formed upon the first magnetic pole layer a gap filling layer. There is then formed upon the gap filling layer a seed layer. There is then formed upon the seed layer a photoresist frame employed in a photoresist frame plating method for forming a plated second magnetic pole layer upon the seed layer, where a base of a sidewall of the photoresist frame has a taper which provides a notch within an edge of the plated second magnetic pole layer at its interface with the seed layer. There is then plated through the photoresist frame plating method the plated second magnetic pole layer upon the seed layer, where the seed layer is formed of a thickness and of a material which compensates when electromagnetically energizing the magnetic transducer for a magnetic write field gradient boundary decompression between the first magnetic pole layer and the plated second magnetic pole layer due to the notch within the plated second magnetic pole layer.

The present invention also contemplates an inductive magnetic write transducer head formed through the method of the present invention.

The present invention provides a photoresist frame plating method for forming a photoresist frame plated magnetic pole layer within an inductive magnetic write transducer head, where there is avoided when electromagnetically energizing the inductive magnetic write transducer head a magnetic write field gradient boundary decompression within the inductive magnetic write transducer head incident to forming a photoresist frame plated notched magnetic pole layer through the photoresist frame plating method. The present invention realizes these objects by employing within the photoresist frame plating method a seed layer formed of a thickness and of a material which compensates for the magnetic write field gradient boundary decompression between a first magnetic pole layer and a plated second magnetic pole layer having a notch formed therein. The plated second magnetic pole layer has the notch formed therein corresponding with a taper within a base of a sidewall of a photoresist frame employed within the photoresist frame plating method.

The method of the present invention is readily manufacturable. The method of the present invention employs a seed layer formed of a thickness and of a material which compensates for a magnetic write field gradient boundary decompression between a first magnetic pole layer and a plated second magnetic pole layer due to a notch formed within the plated second magnetic pole layer when electromagnetically energizing an inductive magnetic write transducer head having the first magnetic pole layer and the plated second magnetic pole layer formed therein. The notch formed within the plated second magnetic pole layer is formed incident to a taper within a base of a sidewall within a photoresist frame employed within the photoresist frame plating method. As disclosed within the preferred embodiment of the present invention, such seed layers may be formed of seed materials and thicknesses which are readily available and accessible within magnetic read-write transducer head fabrication Thus, the method of the present invention is readily manufacturable.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 shows a schematic plan-view diagram of a magnetic read-write transducer head having formed therein a straight sided magnetic pole layer which yields when electromagnetically energizing the magnetic read-write transducer head compressed magnetic write field gradients boundaries as are conventional in the art of magnetic read-write transducer head fabrication.

FIG. 2 shows a schematic plan-view diagram of a magnetic read-write transducer head having formed therein a notched plated pole layer which yields when electromagnetically energizing the magnetic read-write transducer head decompressed magnetic write field gradient boundaries as are conventional in the art of plated magnetic read-write transducer head fabrication.

DESCRIPTION OF THE PREFERRED EMBODIMENT

The present invention provides a photoresist frame plating method for forming a photoresist frame plated magnetic pole layer within an inductive magnetic write transducer head, where there is avoided when electromagnetically energizing the inductive magnetic write transducer head a magnetic write field gradient boundary decompression within the inductive magnetic write transducer head incident to forming a photoresist frame plated notched magnetic pole layer through the photoresist frame plating method. The present invention realizes these objects by employing within the photoresist frame plating method a seed layer formed of a thickness and of a material which compensates for the magnetic write field gradient boundary decompression between a first magnetic pole layer and a plated second magnetic pole layer having a notch formed therein The plated second magnetic pole layer has the notch formed therein corresponding with a taper within a base of a sidewall of a photoresist frame employed within the photoresist frame plating method.

Although the preferred embodiment of the present invention illustrates the present invention employed in forming a plated magnetic pole layer employed within an inductive magnetic write transducer employed within an inductive write-magnetoresistive (MR) read magnetic transducer head typically employed within digitally encoded magnetic data storage and retrieval, the present invention may also be employed in forming a plated magnetic pole layer within an inductive write magnetic transducer employed within magnetic transducer heads including but not limited to inductive write magnetic transducer heads, inductive write-inductive read magnetic transducer heads and inductive write-magnetoresistive (MR) read magnetic transducer heads. The foregoing magnetic transducer heads may be employed within magnetic reading and recording applications including but not limited to analog and digital magnetic reading and recording applications.

Figure 3:
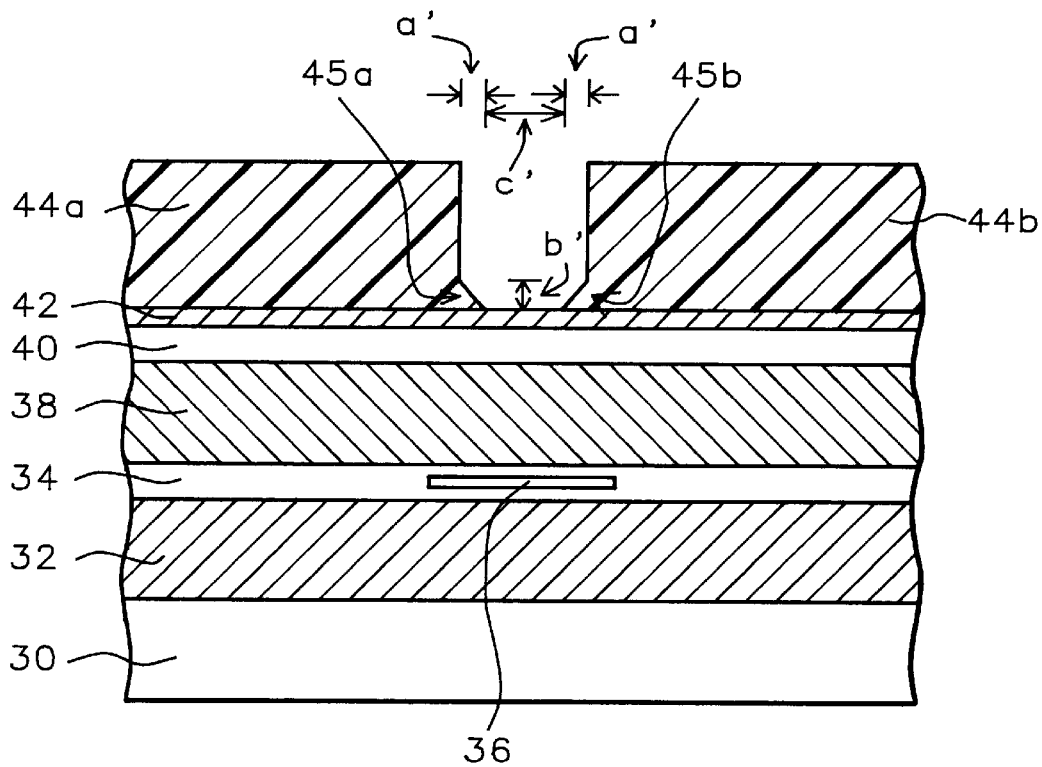
FIGS. 3, 4 and 5 show a series of schematic plan-view diagrams illustrating the results of progressive stages in forming an inductive write-magnetoresistive (MR) read magnetic transducer head in accord with the preferred embodiment of the present invention.

Referring now to FIGS. 3. 4 and 5 there is shown a series of schematic plan-view diagrams illustrating the results of progressive stages in forming an inductive magnetic write transducer employed within an inductive write-magnetoresistive (MR) read magnetic transducer head in accord with the preferred embodiment of the present invention. Shown in FIG. 3 is a schematic cross-sectional diagram of the inductive write-magnetoresistive (MR) read magnetic transducer head at an early stage in its fabrication.

Shown in FIG. 3 is a substrate 30 having formed thereupon or thereover several layers which are employed in forming the inductive write magnetic transducer as well as the inductive write-magnetoresistive (MR) read magnetic transducer head. The layers include: (1) a first shield layer 32 formed upon the substrate 30; (2) a first dielectric layer 34 (having a magnetoresistive (MR) sensor layer 36 formed therein) formed upon the first shield layer 32; (3) a first magnetic pole layer 38 (which also serves as a second shield layer) formed upon the first dielectric layer 34; (4) a gap filling dielectric layer 40 formed upon the first magnetic pole layer 38; (5) a seed layer 42 formed upon the gap filling dielectric layer 40; and (7) a pair of patterned photoresist layers 44a and 44b formed upon the seed layer 44. Each of foregoing substrate and layers may be formed through methods and materials as are generally known in the art of magnetic read-write transducer head fabrication.

For example, although it is known in the art of magnetic read-write transducer head fabrication that substrates are typically formed from non-magnetic ceramic materials including but not limited to oxides, nitrides, carbides, borides and mixtures of oxides, nitrides, carbides and borides, for the preferred embodiment of the present invention, the substrate 30 is preferably formed of a aluminum oxide-titanium carbide non-magnetic ceramic material. Preferably, the substrate 30 is formed with sufficient dimensions such that the substrate 30 may be fabricated into a slider employed within a direct access storage device (DASD) magnetic data storage enclosure employed within digitally encoded magnetic data storage and retrieval.

Similarly, although it is also known in the at of magnetic read-write transducer head fabrication that shield layers and magnetic pole layers are typically formed of soft magnetic materials such as but not limited to permalloy (nickel:iron alloy) soft magnetic materials and higher order alloy soft magnetic materials incorporating permalloy soft magnetic materials, for the preferred embodiment of the present invention, both the first shield layer 32 and the first magnetic pole layer 38 (which simultaneously serves as the second shield layer) are preferably formed of a permalloy (nickel:iron, 80:20, w:w) soft magnetic material. Preferably, the first shield layer 32 is formed to a thickness of from about 1.5 to about 2.5 micrometers, while the first magnetic pole layer 38 is formed to a thickness of from about 2.0 to about 4.0 micrometers.

Yet similarly, although it is also known in the art of magnetic read-write transducer head fabrication that dielectric layers may be formed through any of several methods and materials, including but not limited to chemical vapor deposition (CVD) methods, plasma enhanced chemical vapor deposition (PECVD) methods and physical vapor deposition (PVD) sputtering methods through which may be formed dielectric layers of dielectric materials including but not limited to silicon oxide dielectric materials, silicon nitride dielectric materials and aluminum oxide dielectric materials, for the preferred embodiment of the present invention, each of the first dielectric layer 34 and the gap filling dielectric layer 40 is preferably formed of an aluminum oxide dielectric material deposited through a physical vapor deposition (PVD) sputtering method, as is most common in the art of magnetic read-write transducer head fabrication. Preferably, the first dielectric layer 34 is formed to a thickness of from about 0.1 to about 0.6 micrometers, while the gap filling dielectric layer 40 is preferably also formed to a thickness of from about 0.1 to about 0.6 micrometers.

Still yet similarly, the magnetoresistive (MR) sensor layer 36 is, as is understood by a person skilled in the art, preferably formed of at least a bilayer comprising: (1) a patterned magnetoresistive (MR) material layer having formed upon it ends; (2) a pair of patterned permanent magnet layers or a pair of patterned anti-ferromagnetic material layers, to induce a longitudinal magnetic biasing into the patterned magnetoresistive (MR) layer. For the preferred embodiment of the present invention the patterned magnetoresistive (MR) layer is preferably formed of a permalloy magnetoresistive (MR) material formed to a thickness of from about 100 to about 300 angstroms, while each of the pair of patterned permanent magnet layers or each of the pair of patterned anti-ferromagnetic material layers is formed to a thickness of from about 100 to about 300 angstroms upon opposite ends of the patterned magnetoresistive (MR) layer to define a trackwidth of the patterned magnetoresistive (MR) layer of from about 0.5 to about 3.0 microns.

Further, while it is also known in the art of magnetic read-write transducer head fabrication that seed layers may be formed through any of several methods and materials, including but not limited to electroless plating deposition methods, chemical vapor deposition (CVD) methods and physical vapor deposition (PVD) sputtering methods through which may be formed seed layers of seed materials including but not limited to copper containing seed materials, aluminum containing seed materials and conductive magnetic seed materials such as but not limited to permalloy conductive magnetic seed materials, for the preferred embodiment of the present invention the seed layer 42 is formed of a thickness and of a material which compensates for a magnetic write field gradient boundary decompression incident to electromagnetically energizing the inductive magnetic write-magnetoresistive (MR) read transducer head within which is formed the first magnetic pole layer 38 and a plated second magnetic pole formed within the aperture defined by the patterned photoresist layers 44a and 44b. The magnetic write field gradient boundary decompression is otherwise due to a notch formed within the plated second magnetic pole layer corresponding with a taper within a base of a sidewall of the patterned photoresist layers 44a and 44b.

In order to achieve the foregoing result, the seed layer 42 is preferably formed of a seed material having a comparatively high magnetic permeability. Preferably the seed material has a magnetic permeability of greater than about 1000. More preferably, the seed material has a magnetic permeability of from about 2000 to about 5000.

In addition to being formed of a seed material having a comparatively high magnetic permeability, the seed material from which is formed the seed layer 42 also preferably has a comparatively high saturation magnetic moment, the magnitude of which defines a minimum thickness of the seed layer 42. Preferably, the seed material has a saturation magnetic moment of at least about 10000 gauss, which defines the seed layer 42 thickness as preferably no less than about 3000 angstroms. Seed materials which fulfill this criteria include but are not limited to permalloy (nickel:iron, 80:20, w:w) seed materials and sendust seed materials. More preferably, the seed material has a saturation magnetic moment of at least about 15000 gauss, which defines the seed layer 42 thickness as preferably no less than about 2000 angstroms. Seed materials which fulfill this criteria include but are not limited to nickel:iron (50−x:50+x, w:w) seed materials, iron nitride (ie: FeN) seed materials and iron-aluminum nitride (ie: FeAlN) seed materials.

For practical reasons relating to manufacturing efficiency, most typically within the preferred embodiment of the present invention the seed layer 42 is formed of a permalloy (nickel:iron, 80:20, w:w) seed material formed upon the gap filling dielectric layer 40 to a thickness of from about 3000 to about 4000 angstroms through a physical vapor deposition (PVD) sputtering method.

Within the method of the present invention it is generally desirable to employ the seed layer 42 of minimal practicable thickness consistent with the objects of the present invention in order to provide optimal manufacturing efficiency in forming magnetic transducer heads through the method of the present invention. Finally, with respect to the patterned photoresist layers 44a and 44b, the patterned photoresist layers 44a and 44b may be formed from any of several photoresist materials as are conventionally employed in the art of magnetic read-write transducer head fabrication, including but not limited to photoresist materials chosen from the general groups of photoresist materials including but not limited to positive photoresist materials and negative photoresist materials. Preferably, the patterned photoresist layers 46a and 46b are formed of a photoresist material having optimal dimensional stability within plating methods through which are formed magnetic pole layers within the art of magnetic read-write transducer head fabrication.

As is illustrated within FIG. 3, the patterned photoresist layers 44a and 44b form a photoresist frame which defines an aperture of width "c'+2a'" of from about 1.0 to about 3.0 microns exposing the seed layer 42. At the base of each of the sidewalls of the photoresist frame there is formed a taper 45a or 45b of width "a'" from about 0.1 to about 0.3 microns over the width of the seed layer 42 and of height "b'" from about 0.2 to about 0.4 microns within the thickness of each of the patterned photoresist layers 44a and 44b. Preferably the patterned photoresist layers 44a and 44b are from about 5 to about 8 microns thick each.

Figure 4:
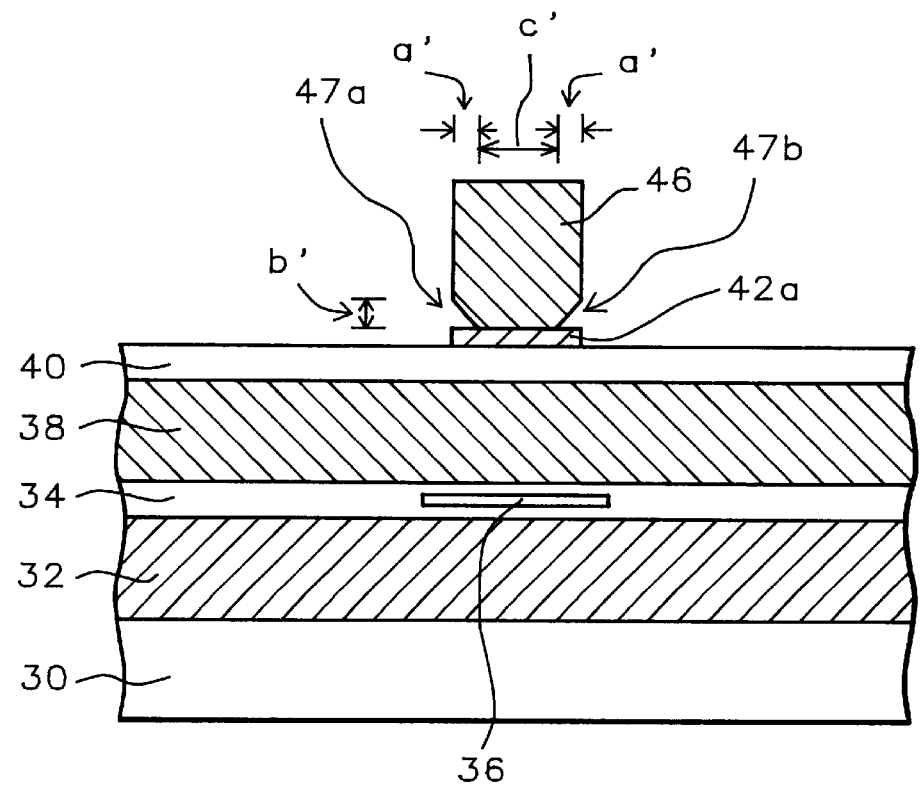

Referring now to FIG. 4, there is shown a schematic plan-view diagram illustrating the results of further processing of the inductive write-magnetoresistive (MR) read magnetic transducer head whose schematic plan-view diagram is shown in FIG. 3. Shown in FIG. 4 is a schematic plan-view diagram of an inductive write-magnetoresistive (MR) read magnetic transducer head otherwise equivalent to the inductive write-magnetoresistive (MR) read magnetic transducer head whose schematic plan view diagram is illustrated in FIG. 3, but wherein: (1) there has been plated within the aperture defined by the patterned photoresist layers 44a and 44b a plated second magnetic pole layer 46 having formed therein a pair of notches 47a and 47b, the pair of notches 47a and 47b corresponding with the dimensions of the pair of tapers 45a and 45b within the patterned photoresist layers 44a and 44b; (2) there has been removed the patterned photoresist layers 44a and 44b; and (3) the seed layer 42 has been patterned to form the patterned seed layer 42a.

When forming from the inductive write-magnetoresistive (MR) read magnetic transducer head whose schematic cross-sectional diagram is illustrated in FIG. 3 the inductive write-magnetoresistive (MR) read magnetic transducer head whose schematic cross-sectional diagram is illustrated in FIG. 4, the plated second magnetic pole layer 46 may be formed within the aperture defined by the patterned photoresist layers 44a and 44b through plating methods and materials as are conventional in the art of magnetic read-write transducer head fabrication. Such plating methods may include, but are not limited to, electroless plating methods and electrochemical plating methods through which may be formed plated magnetic pole layers of plated magnetic materials including but not limited to permalloy magnetic materials and higher order alloys incorporating permalloy magnetic materials. For the preferred embodiment of the present invention, the plated second magnetic pole layer 46 is preferably formed through an electrochemical plating method to form the plated second magnetic pole layer 46 of a permalloy (ie: nickel:iron, 80:20, w:w) alloy magnetic material of thickness no greater than the thickness of the patterned photoresist layers 44a and 44b. Preferably, the plated second magnetic pole layer 46 so formed has a thickness of from about 2 to about 5 microns.

Similarly, once having formed the plated second magnetic pole layer 46 within the aperture defined by the patterned photoresist layers 44a and 44b as illustrated in FIG. 3, the patterned photoresist layers 44a and 44b may be stripped from the surface of the inductive write-magnetoresistive (MR) read magnetic transducer head whose schematic cross-sectional diagram is illustrated in FIG. 3 through methods as are similarly conventional in the art of magnetic read-write transducer head fabrication. Typically and preferably, the patterned photoresist layers 44a and 44b are stripped from the surface of the inductive write-magnetoresistive (MR) read magnetic transducer head whose schematic cross-sectional diagram is illustrated in FIG. 3 through wet chemical photoresist stripping methods or dry plasma photoresist stripping methods as are conventional in the art of magnetic read-write transducer head fabrication.

Finally, as is similarly understood by a person skilled in the art, the seed layer 42 as illustrated within the inductive write-magnetoresistive (MR) read magnetic transducer head whose schematic plan-view diagram is shown in FIG. 3 may be etched to form the patterned seed layer 42a as illustrated within the inductive write-magnetoresistive (MR) read magnetic transducer head whose schematic plan-view diagram is shown in FIG. 4 through etching methods as are similarly conventional in the art of magnetic read-write transducer head fabrication, which etching methods may include, but are not limited to, ion beam etch (IBE) methods and reactive ion beam etch (RIBE) methods. For the preferred embodiment of the present invention, the seed layer 42 as shown within the inductive write-magnetoresistive (MR) read magnetic transducer head whose schematic plan-view diagram is illustrated in FIG. 3 is etched to form the patterned seed layer 42a within the inductive write-magnetoresistive (MR) read magnetic transducer head whose schematic plan-view diagram is illustrated in FIG. 4 through an ion beam etch (IBE) method employing an argon ion etchant, as is common in the art of magnetic read-write transducer head fabrication.

Upon etching within the inductive write-magnetoresistive (MR) read magnetic transducer head whose schematic plan-view diagram is illustrated in FIG. 3 the seed layer 42 to form the patterned seed layer 42a within the inductive write-magnetoresistive (MR) read magnetic transducer head whose schematic plan-view diagram is illustrated in FIG. 4, there is formed through the preferred embodiment of the present invention an inductive write-magnetoresistive (MR) read magnetic transducer head where there is avoided incident to electromagnetically energizing the inductive write-magnetoresistive (MR) read magnetic transducer head decompression of the magnetic write field gradient boundaries between the first magnetic pole layer 38 and the plated second magnetic pole layer 46. Decompression of the magnetic write field gradient boundaries is avoided through the present invention by employing when forming the plated upper magnetic pole layer 46 a seed layer 42 of a thickness and of a material which compensates for the magnetic write field gradient boundary decompression between the first magnetic pole layer 38 and the plated second magnetic pole layer 46 due to the pair of notches 47a and 47b within the plated second magnetic pole layer 46.

Although not required within the preferred embodiment of the present invention, a narrower write fringe field may be obtained within the inductive write-magnetoresistive (MR) read magnetic transducer head whose schematic plan-view diagram is illustrated in FIG. 4 through a further etching of the blanket gap filling dielectric layer 40 and the first magnetic pole layer 38 to form within the first magnetic pole layer 38 a pole tip aligned with the plated second magnetic pole layer 46. A schematic plan-view diagram illustrating the results of such etching is illustrated in FIG. 5.

Figure 5:
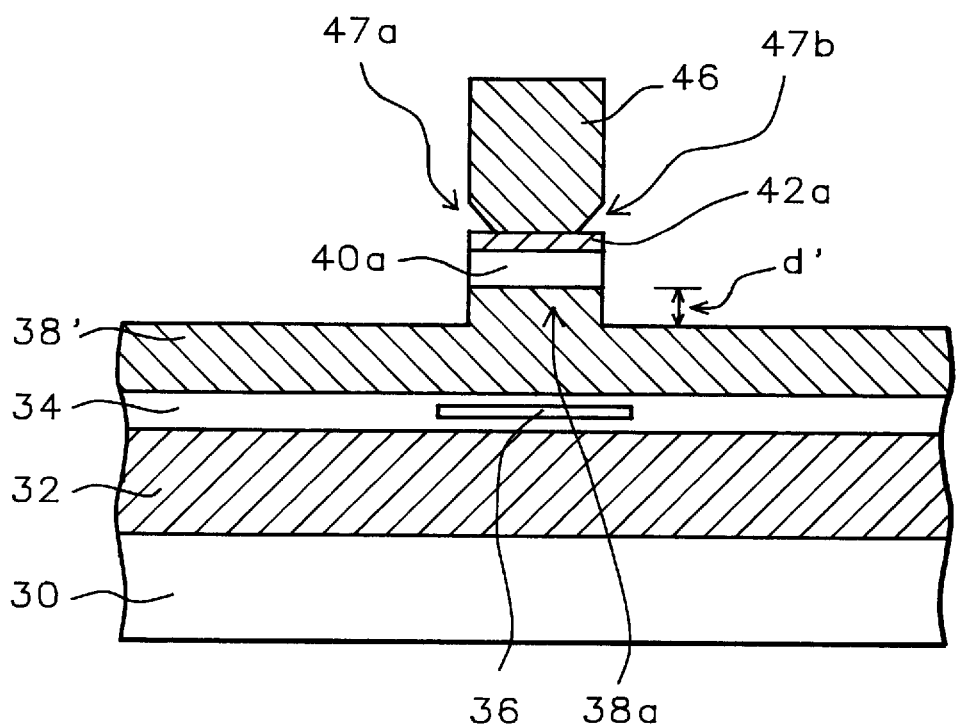
Figures 6, 7, 8:
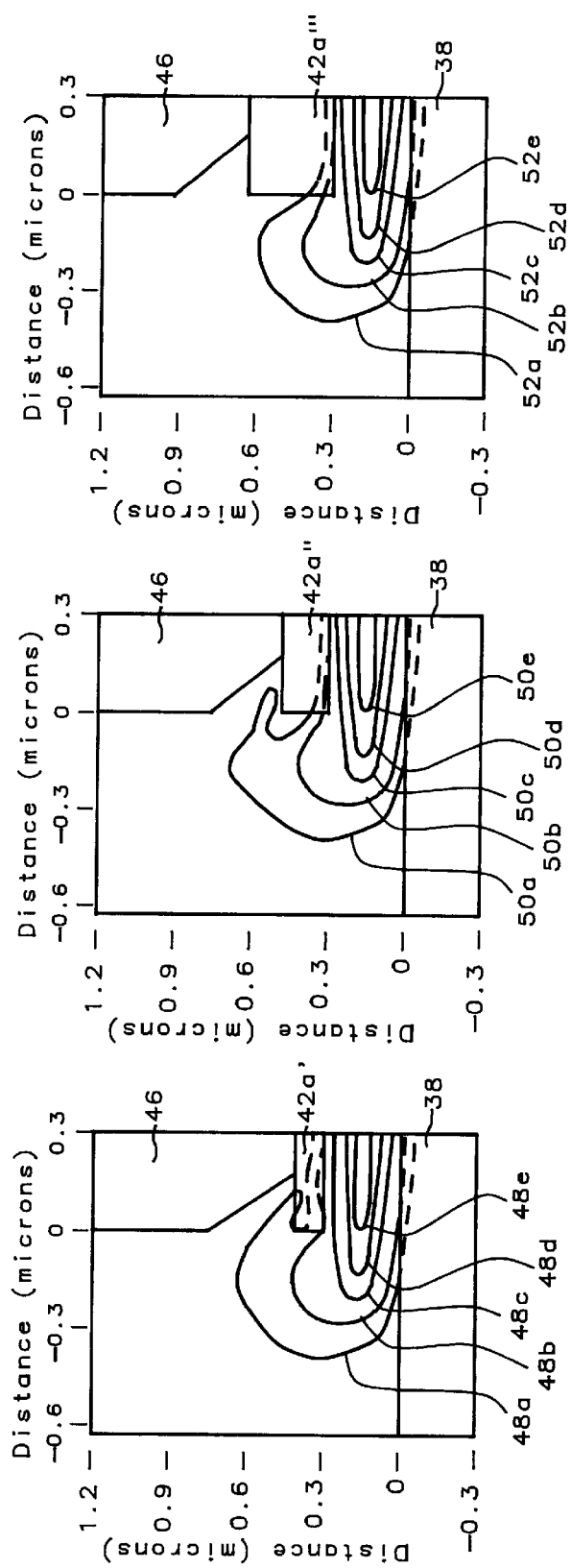
FIGS. 6, 7, 8, 9 and 10 show a series of schematic plan-view diagrams illustrating magnetic read-write transducer heads and associated magnetic write field gradient boundaries incident to electromagnetically energizing those magnetic read-write transducer heads, the schematic plan-view diagrams corresponding with the examples which illustrate operability of the present invention.

Shown in FIG. 5 is a schematic plan-view diagram of an inductive write-magnetoresistive (MR) read magnetic transducer head otherwise equivalent to the inductive write-magnetoresistive (MR) read magnetic transducer head whose schematic plan view diagram is illustrated in FIG. 4, but wherein the gap filling dielectric layer 40 has been etched to form the patterned gap filling dielectric layer 40a and the first magnetic pole layer 38 has been partially etched to form the partially etched first magnetic pole layer 38' having formed therein a first magnetic pole tip 38a aligned with the patterned gap filling dielectric layer 40a, the patterned seed layer 42a and the plated second magnetic pole layer 46. Preferably, the partially etched first magnetic pole layer 38' is etched to a distance "d'" within the thickness of the first magnetic pole layer 38 of from about 1000 to about 10000 angstroms to provide the first magnetic pole tip 38a as illustrated in FIG. 5.

Although the inductive write-magnetoresistive (MR) read magnetic transducer head whose schematic plan view diagram is illustrated in FIG. 5 may be formed from the inductive write-magnetoresistive (MR) read magnetic transducer head whose schematic plan-view diagram is illustrated in FIG. 4 through etch methods as are conventional in the art of magnetic read-write transducer head fabrication, which etch methods include, but are not limited to, ion beam etch (IBE) methods and reactive ion beam etch (RIBE) methods, for the preferred embodiment of the present invention the inductive write-magnetoresistive (MR) read magnetic transducer head whose schematic plan-view diagram is illustrated in FIG. 5 is preferably formed from the inductive write-magnetoresistive (MR) read magnetic transducer head whose schematic plan-view diagram is illustrated in FIG. 4 through an ion beam etch (IBE) method employing an argon etchant ion under conditions analogous or equivalent to the conditions employed in forming from the seed layer 42 as illustrated in FIG. 3 the patterned seed layer 42a as illustrated in FIG. 4.

As is understood by a person skilled in the art, there may be formed within and/or upon the inductive write-magnetoresistive (MR) read magnetic transducer head whose schematic plan-view diagram is illustrated in FIG. 4 or FIG. 5 additional layers and structures in positions and with thicknesses as are conventional in the art of magnetic read-write transducer head fabrication. Such additional layers and structures may include, but are not limited to, additional insulator and shield layers, coil structures and layers, passivation layers, interconnection layers and terminal metallization layers.

EXAMPLES

A prophetic computer simulation was undertaken to delineate within inductive write magnetic transducer heads formed in accord with the preferred embodiment of the present invention the location of magnetic write field gradient boundaries as a function of seed layer thickness and seed layer saturation magnetic moment, at constant seed layer magnetic permeability.

Within the prophetic computer simulation there was assumed: (1) a first magnetic pole layer (corresponding with the first magnetic pole layer 38) formed of a permalloy (nickel:iron, 80:20, w:w) alloy at a thickness of 2 microns, having a magnetic permeability of 2000 and a having a saturation magnetic moment of 10000 gauss; (2) a gap filing dielectric layer (corresponding with the gap filling dielectric layer 40) of thickness 3000 angstroms; (3) a patterned seed layer (corresponding with the patterned seed layer 42a) having a magnetic permeability of 2000; and (4) a plated second magnetic pole layer (corresponding with the plated second magnetic pole layer 46) formed of a permalloy (nickel:iron, 80:20, w:w) alloy at a thickness of 4 microns, having a magnetic permeability of 2000 and having a saturation magnetic moment of 10000 gauss. Finally, there was also assumed within the prophetic computer simulation a notch within the plated second magnetic pole layer of a width 2000 angstroms (corresponding with the dimension "a'" within FIG. 4) exposing the patterned seed layer and of a distance 3000 angstroms (corresponding with the dimension "b'" within FIG. 4) within the thickness of the plated second magnetic pole layer.

Within the prophetic computer simulation there was also assumed electromagnetic energizing of the inductive write magnetic transducer heads employing constant write current conditions as are conventional in the art of inductive write magnetic transducer head fabrication and operation.

The prophetic computer simulations were undertaken in two dimensions using commercially available software available under the tradename MAGNETO®, version 2.9, provided by Integrated Engineering Software, Winnipeg, Manitoba, Canada R3H 0X4. Within the prophetic computer simulations there was calculated two dimensional magnetic potential distributions from the non-linear first magnetic pole layers and plated second magnetic pole layers on the air bearing surface (ABS) planes of the inductive write magnetic transducer heads. The two dimensional magnetic potential distributions were then calculated and confirmed in a third dimension for a recording disk plane spaced parallel from the air bearing surface (ABS) planes through use of Green's function method as described in J. D. Jackson, *Classical Electrodynamics,* sec. 1.10, John Wiley & Sons, Inc. (1975).

Within FIGS. 6, 7, 8, 9 and 10 there is shown a series of schematic plan-view diagrams which illustrate prophetic two dimensional computer simulations derived from patterned seed layers 42a', 42a" and 42a'" of corresponding thicknesses 1000, 2000 and 3000 angstroms, each of which patterned seed layers 42a', 42a" and 42a'" has a saturation magnetic moment of 10000 gauss (which corresponds with permalloy (nickel:iron, 80:20, w:w) alloy magnetic material). As is seen from the schematic plan-view diagrams of FIG. 6 and FIG. 7 the magnetic write field gradient boundaries 48a–48e and 50a–50e (which correspond to progressive magnetic field strengths of 1800 oersteds to 3800 oersteds in 500 oersted increments) shown substantially decompressed magnetic write field gradient boundaries. In comparison, within FIG. 8, the magnetic write field gradient boundaries 52a–52e (which correspond to progressive magnetic field strengths of 1800 oersteds to 3800 oersteds in 500 oersted increments) show substantially compressed magnetic write field gradient boundaries. Thus, the present invention is operative for a patterned seed layer of seed material having a saturation magnetic moment of at least about 10000 gauss at a thickness of no less than about 3000 angstroms.

Figures 9, 10:
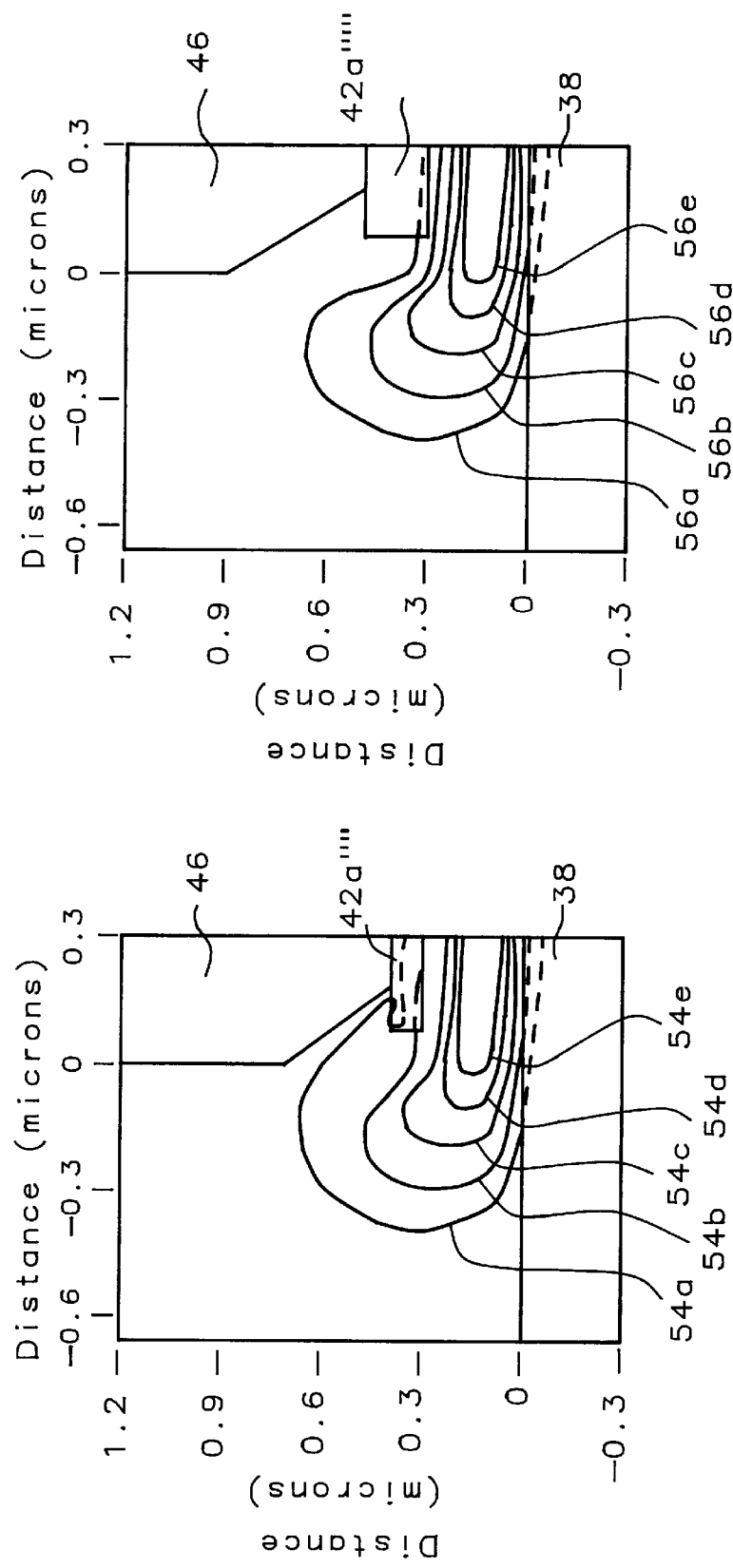

Within FIG. 9 and FIG. 10 there is shown a pair of schematic plan-view diagrams which illustrate prophetic two dimensional computer simulations including patterned seed layers 42a'"' and 42a'"'' of corresponding thicknesses 1000 and 2000 angstroms, each of which patterned seed layers 42a'"' and 42a'"'' has a saturation magnetic moment of 15000 gauss. As is seen from the schematic plan-view diagrams of FIG. 9 the magnetic write field gradient boundaries 54a–54e (which correspond to progressive magnetic field strengths of 1800 oersteds to 3800 oersteds in 500 oersted increments) shown substantially decompressed magnetic write field gradient boundaries. In comparison, within FIG. 10, the magnetic write field gradient boundaries 56a–56e (which correspond to progressive magnetic field strengths of 1800 oersteds to 3800 oersteds in 500 oersted increments) show substantially compressed magnetic write field gradient boundaries. Thus, the present invention is operative for a patterned seed layer of seed material having a saturation magnetic moment of at least about 15000 gauss at a thickness no less than about 2000 angstroms.

As is understood by a person skilled in the art, the preferred embodiment and examples of the present invention are representative of the present invention rather than limiting of the present invention. Revisions and modifications may be made to materials, structures and dimensions through which is formed the inductive write-magnetoresistive (MR) read magnetic transducer head of the preferred embodiment of the present invention while still providing magnetic transducer head structures which are within the spirit and scope of the present invention, as defined by the accompanying claims.

What is claimed is:

1. A method for forming a magnetic transducer comprising:

providing a substrate;

forming over the substrate a first magnetic pole layer;

forming upon the first magnetic pole layer a gap filling layer;

forming upon the gap filling layer a seed layer;

forming upon the seed layer a photoresist frame employed in a photolithographic frame plating method for forming a plated second magnetic pole layer upon the seed layer, a base of a sidewall of the photoresist frame having a taper which provides a notch within an edge of the plated second magnetic pole layer at its interface with the seed layer;

plating through the photoresist frame plating method the plated second magnetic pole layer upon the seed layer, where the seed layer is formed of a thickness and of a material which compensates when electromagnetically energizing the magnetic transducer for a magnetic write field gradient boundary decompression between the first magnetic pole layer and the plated second magnetic pole layer due to the notch within the plated second magnetic pole layer;

removing the photoresist frame from upon the seed layer, and etching while employing the second magnetic pole layer as an etch mask the seed layer to form a patterned seed layer aligned with the plated second magnetic pole layer.

2. The method of claim 1 wherein the notch within the plated second magnetic pole layer has a distance of from about 2000 to about 4000 angstroms within the thickness of the plated second magnetic pole layer and a distance of from about 1000 to about 3000 angstroms exposing the surface of the seed layer.

3. The method of claim 1 wherein the seed layer is formed of a seed material having a magnetic permeability of greater than about 1000.

4. The method of claim 3 wherein the seed layer is formed of a seed material having a saturation magnetic moment of at least about 10000 gauss and a thickness of no less than about 3000.

5. The method of claim 4 wherein the seed layer is formed of a permalloy (nickel:iron, 80:20, w:w) seed material.

6. The method of claim 3 wherein the seed layer is formed of a seed material having a saturation magnetic moment of at least about 15000 and a thickness of no less than about 2000 angstroms.

7. The method of claim 6 wherein the seed layer is formed of a seed material selected from the group of magnetic seed materials consisting of nickel:iron (50−x:50+x, w:w), iron nitride and iron-aluminum nitride seed materials.

8. The method of claim 1 further comprising etching the gap filling layer and the first magnetic pole layer while employing the patterned second magnetic pole layer and the patterned seed layer as a mask to form a patterned gap filling layer and a partially etched first magnetic pole layer, where the partially etched first magnetic pole layer has formed therein a first magnetic pole tip aligned with the patterned gap filling layer, the patterned seed layer and the plated second magnetic pole layer.

9. A magnetic head having formed therein a magnetic transducer formed in accord with the method of claim 1.

10. The magnetic head of claim 9 wherein the magnetic head is selected from the group of magnetic heads consisting of inductive write magnetic heads, inductive write-inductive read magnetic heads and inductive write-magnetoresistive (MR) read magnetic heads.

* * * * *